Sept. 18, 1956   L. J. BERBERICH ET AL   2,763,315
FLEXIBLE BONDED MICA INSULATION
Filed May 10, 1950
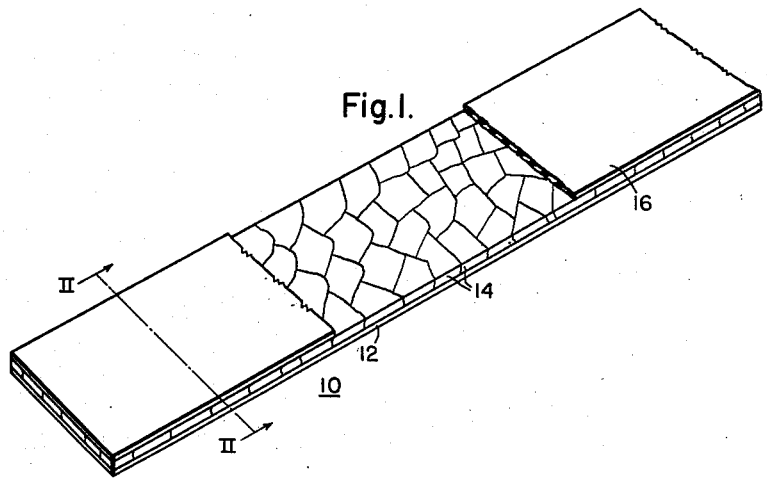
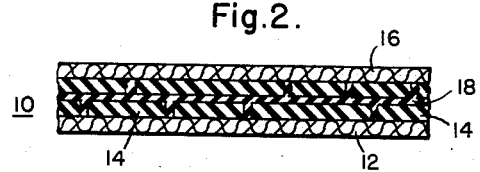
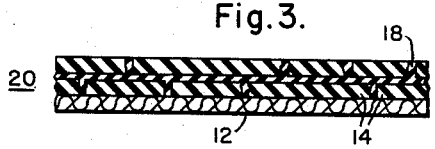
WITNESSES:
Edward Michaels
Nw. L. Groome
INVENTORS
Leo J. Berberich &
Harold M. Philofsky.
BY Frederick Shapoe
ATTORNEY

United States Patent Office 2,763,315
Patented Sept. 18, 1956

2,763,315

FLEXIBLE BONDED MICA INSULATION

Leo J. Berberich and Harold M. Philofsky, Pittsburgh, Pa., assignors to Westinghouse Electric Corporation, East Pittsburgh, Pa., a corporation of Pennsylvania Application May 10, 1950, Serial No. 161,231

4 Claims. (Cl. 154—2.6)

This invention relates to mica insulation and in particular flexible insulating materials embodying mica and a liquid resinous binder.

This application is a continuation-in-part of our patent application Serial No. 57,008, filed October 28, 1948, entitled Electrical Coils Insulated With Mica and Synthetic Resins, now abandoned.

According to previous practices in the manufacture of mica insulation, such insulation has been prepared almost entirely from mica flakes and solidified resinous binders. If flexible composite mica insulation were desired, the practice has been to employ a soft or rubbery solid resin that would impart flexibility to the composite mica insulation. With rare exceptions, the binders for the mica flakes have comprised solid resins or gels. It has also been suggested to employ water or a similar fugitive and readily evaporable binder to hold mica flakes together temporarily. However, the fugitive binders did not impart any strength to the composite insulation. Also, some volatiles such as water, if applied to a paper backing of a mica tape would seriously diminish its strength. For all practical purposes, such temporary binders do not contribute to the strength of the composite insulation but merely enable the mica flakes to stick loosely to one another so that a tape thereof could be handled with care without falling apart.

The object of the present invention is to provide composite mica insulation comprising a pliable sheet base material and a layer of mica flakes applied thereto and a liquid binder composed of liquid resinous polymers of a viscosity of between 25 and 10,000 poises at 25° C., the binder being relatively non-volatile.

A further object of the invention is to provide a strong and flexible composite insulation embodying a pliable sheet backing and a layer of mica flakes held together by a liquid resinous polymer having a viscosity of 25 and 10,000 poises at 25° C., the polymer being relatively non-volatile.

Other objects of the invention will in part be obvious and will in part appear hereinafter. For a better understanding of the nature and objects of the invention, reference should be had to the following detailed description and drawing, in which:

Figure 1 is an enlarged view in perspective partly broken of a sheet of the composite mica tape insulation, Fig. 2 is a cross section on the line II—II of Fig. 1 showing fabric backed tape, and Fig. 3 is a cross section through a modified form of the composite insulation.

In accordance with this invention, flexible and strong composite mica insulation is prepared by applying a layer of mica flakes to a pliable sheet base material or backing and applying to the mica flakes and the pliable sheet a liquid binder composed of at least one liquid resinous polymer of a viscosity of between 25 and 10,000 poises measured at 25° C., the polymer being relatively non-volatile at room conditions, the liquid binder not decomposing or depolymerizing appreciably at temperatures of up to 150° C. These liquid resinous polymers impart surprising and unexpected strength to the composite mica insulation. Composite mica insulation so prepared possesses sufficient strength that it may be wrapped so tightly and firmly about electrical conductors as to produce as dense and firm insulation as possible with any previously used binder, and far better than with a tape prepared with a fugitive solvent binder. It is extremely flexible so that it may be applied easily in the usual manner to almost any shape or size of conductor without loss of mica flakes. The use of a binder composed of a liquid resinous polymer of the type specified enables the composite insulation to hold together during fabrication, storage, shipping, and application to electrical members without loss of strength or adherence.

If the liquid resinous polymer used as the binder has a viscosity of below 25 poises at 25° C., the strength of the composite mica tape is greatly lessened. Thus a binder of a viscosity of 10 poises at 25° C. not only fails to produce a composite tape with good strength, but the binder is so fluid it will soak into paper backing materials and ooze out of the insulation. Binders of a viscosity of above 10,000 poises at 25° C., produce tapes without the advantages of those produced herein.

The outstanding advantage of a flexible composite mica insulating material of this nature is that it lends itself unusually well to subsequent impregnation and treatment with resinous materials. The use of the composite insulation with impregnants is disclosed more fully in our copending application Serial No. 57,008, filed October 28, 1948, and the continuation-in-part thereof filed concurrently herewith Serial No. 161,232, now abandoned.

Referring to Figs. 1 and 2 of the drawing, there is illustrated a tape 10 of the composite mica insulation prepared in accordance with the present invention. The tape 10 comprises a pliable sheet base material 12 upon which is applied a layer 14 composed of mica flakes of any suitable size and shape. For many purposes a second layer of pliable sheet base material 16 is superimposed on the layer of mica flakes. As shown in cross section in Fig. 2 of the drawing, the spaces between the mica flakes contain a binder 18 composed of liquid resinous polymer of a viscosity of from 25 to 10,000 poises at 25° C.

The pliable sheet base material, for instance, may be Rice paper or supercalendered rope paper or other paper. Such papers are available in thicknesses as low as the order of 1 mil (0.001"). Furthemore, the sheet base material may comprise other materials such as glass fiber cloth, asbestos cloth, asbestos paper or cotton cloth. The asbestos paper may comprise ordinary milled asbestos admixed with small amounts of cellulosic fibers or it may be formed from asbestos that has been ball-milled to an extremely fine subdivision of the asbestos fibers, often called microfine asbestos. Synthetic resins either in the form of films or woven fabrics, such, for example, as nylon cloth or nylon film, may be employed as the sheet base material. Woven fabric from fibers prepared from linear polymethyleneterephthalate, or films from the same polymer are an excellent backing material. The preparation of these terephthalate polymers is set forth in Whinfield et al. U. S. Patent 2,465,319. Sheets of other synthetic resins, such as cellulose acetate butyrate or polyethylene may be employed as a base for the composite mica insulation. It is not necessary that both of the two base sheets applied on either side of the layer of the mica flakes be of the same material. Thus the composite mica insulation may comprise a backing of paper and a superposed layer of asbestos paper, or asbestos and glass fiber fabric. Glass fiber cloth or asbestos paper may be employed respectively for the top and the bottom of the tape.

The mica flakes employed in the preparation of the composite insulation of this invention may be either muscovite or phlogopite mica. However, other forms of sheet inorganic insulating materials corresponding to or the equivalent of mica, both natural and artificial or synthetic may be employed. The size of the mica flakes is selected in accordance with the application. For the highest grade electrical insulation, the mica flakes should be of a size of approximately 1″ diameter and greater. However, as well understood by those skilled in the art, mica splittings or flakes are of extremely random and variable size even when classified closely, and mixtures averaging 1 inch in diameter but admixed with significant amounts of smaller flakes have been used successfully. The average diameter of the mica flakes should exceed ¼″ to produce useful products.

The mica insulation of the present invention may be prepared by hand or in a conventional mica laying machine. Good results have been secured by employing a mica laying machine, wherein a sheet of the pliable base material, such as rope paper, passes below a mica dropping tower that applies a thickness of two or three mica flakes on the average on the surface of the sheet, with some manual inspection and patching to fill in any thin or uncovered spots on the base sheet. A solution of the liquid resinous polymer binder dissolved in a volatile solvent to provide solutions of a viscosity of about 10 poises and less having from 5 to 90% by weight of the polymer therein is dripped upon the mica flakes in a quantity sufficient to wet them. The wetted mica layer is rolled to spread the solution of the binder between the mica flakes and the base material. Additional layers of mica flakes may be applied as required. We have found that a layer of mica applied in this manner is adequate for the preparation of flexible mica tape for use in high-voltage electrical machinery. Finally, a top sheet 16 of the base material is applied and the insulation is rolled lightly to cause the binder to spread throughout the mica flake layer 14 and to wet the sheet base materials 12 and 16. The composite insulation is then heated to evaporate the volatile solvent, leaving substantially only the liquid resinous binder.

For some purposes, it is not necessary to employ more than a single sheet of pliable base material, as illustrated in Fig. 3 of the drawing. The composite insulation 20 shown in this figure comprises only one sheet 12 of the base material upon which is applied the mica flakes 14 and the liquid binder 18.

Suitable solvents for dissolving the liquid resinous binders may be selected from low viscosity, low boiling point solvents such as toluene, benzene, xylene, Stoddard solvent, petroleum hydrocarbon fractions boiling at about 110°–120° C. or 135°–165° C., ethyl alcohol, isopropyl alcohol, methyl ethyl ketone, amyl acetate, cyclohexanol, methyl formate, ethyl lactate, ethylene glycol monoethyl ether, tetrahydrofuran, diisobutylketone, and mixtures of any two or more of these. It is desirable that the solvent evaporate readily when heated to a temperature not exceeding approximately 150° C. The viscosity of such solvent also should be less than 2 poises at 25° C.

The composite mica insulation of the present invention may be employed in the form of long sheets or strips. However, we have found that for the preparation of high-voltage insulated conductors therefrom, it is most convenient to slit the mica insulation into tape form. The tapes may be wrapped on electrical conductors more readily and to produce better results than could be accomplished with a wide sheet. The tapes may be from ½ inch to 2 or more inches in width. Such tape applied to a conductor by wrapping it in overlapping manner enables the subsequent impregnation of the mica insulation with a suitable liquid resinous binder to be effected thoroughly and conveniently.

Numerous liquid resinous polymers of a viscosity of between 25 and 10,000 poises, the polymers being relatively non-volatile at room temperature, are available as binders for the practice of the invention. One group of binders comprises the liquid polymers of a compound having the formula

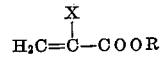

wherein X represents a monovalent radical selected from the group consisting of hydrogen and saturated aliphatic and cycloaliphatic hydrocarbon radicals and R is selected from the group of monovalent radicals consisting of hydrogen and saturated aliphatic hydrocarbon radicals. Examples of such compounds are the alkyl esters of acrylic acid and aliphatic esters of methacrylic and higher aliphatic acrylic acid esters. Examples of suitable compounds of this type are polymethylmethacrylate of a molecular weight of 1000, octyldecyl esters of methacrylic acid polymerized to a molecular weight of about 10,000, such liquid composition being sold under the tradename "Acryloid HF–45," polyamylacrylate, polyhexylmethacrylate, cyclohexylmethacrylate and the like, of a molecular weight of from 1000 to 10,000.

A broader group of liquid polymeric binders may comprise one or more polymers of a compound having the formula

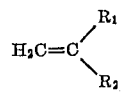

wherein $R_2$ represents a monovalent radical selected from the group consisting of phenyl, saturated alkyl hydrocarbon substituted phenyl, methyl and hydrogen radicals; $R_1$ represents a monovalent radical selected from the group consisting of hydrogen, methyl and COOX radicals wherein X represents hydrogen and saturated alkyl hydrocarbon groups, and $R_1$ and $R_2$ do not represent the same radical. When $R_2$ is COOX the previous group of esters of acrylic acid is comprised. Examples of this broad group of binders are polystyrene, 4-chlorostyrene, 2,4-dimethyl styrene, polyalphamethyl styrene, polyethylene, polymerized alphaphenyl acrylic acid, polymerized methyl ester of atropic acid, and polyalphamethylparamethyl styrene. We have secured excellent results with a liquid binder composed of polymerized alphamethylstyrene of an average molecular weight of between 400 and 2000. Polymerized alphamethylstyrene of an average molecular weight of 500 has a viscosity of approximately 2000 poises at 25° C. Mixtures of low molecular weight polystyrene, for example, 25 parts by weight of polystyrene of a molecular weight of 50,000 and 75 parts by weight of polyalphamethyl styrene of a molecular weight of 500 form a liquid suitable for use as a mica binder. Polymers of mixtures of arylalkene compounds, such as polymers of a mixture of styrene and coumarone or a mixture of styrene, coumarone and indene polymerized to low polymers of a viscosity between 25 and 10,000 poises have given excellent bonds to mica.

The liquid polymers of coumarone and indene, and liquid copolymers of both, or mixtures of each liquid polymer have proven to be excellent binders for the mica flakes.

The liquids produced by polymerizing beta-pinene in the presence of a catalyst have been found to be satisfactory binders. The formula for such polymers is:

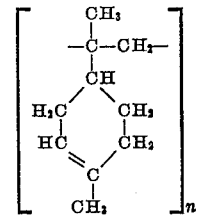

where $n$ has an average value of 4 or more.

Another excellent class of liquid resinous polymers for the mica insulation of the present invention are liquid linear polyesters polymerized to a viscosity of between 25 and 10,000 poises. Suitable esters may be produced by reacting a mono-or-dicarboxylic acid or anhydride of the latter with a saturated aliphatic glycol. Some examples of such polyesters are triethylene glycol di-2-ethyl butyrate, di-2-ethyl azaleate, di-2-ethylhexyl sebacate, di-n-hexyl fumarate polymer, di-n-decylalkenyl succinate. The preparation of such esters is set forth in Patent 2,460,035. Abietic acid or rosin may be reacted with polyhydric alcohols such as ethylene glycol, glycerine and triethylene glycol to produce liquid esters. Other esters may be prepared by reacting an apha, beta-ethylenically unsaturated dicarboxylic acid or anhydride thereof, such as for example, maleic acid, fumaric acid and citraconic anhydride with a saturated aliphatic glycol such, for example, as ethylene glycol, diethylene glycol, propylene glycol and polyethylene glycol with one or more saturated dicarboxylic acids, such as adipic, sebacic or succinic acid. An example thereof is the reaction product of 1 mole of fumaric acid, 1 mole of adipic acid and 2 moles of diethylene glycol produced by heating the reactants at 175° C. for 1½ hours.

The liquid resinous polymers described herein may be employed individually or in admixture with one another; thus mixtures of liquid coumarone-indene polymers and liquid polymerized alpha-methylstyrene will give good results as a binder for the mica.

Mica tapes have been prepared from the following liquid resinous polymers, the polymer being employed in the proportions indicated based on the total weight of the entire insulation:

Table

| Polymer | Approximate Molecular Weight | Percent Bond in Tape |
| --- | --- | --- |
| Polymethylmethacrylate | 1,000 | 10 |
| Poly-α-methyl styrene | 4,000 | 16.4 |
| Polystyrene | 1,500 | 11.2 |
| Coumarone-indene | 1,000 | 6 |
| Polyalphamethylstyrene | 3,000 | 3 to 25 |
| Polymers of styrene and coumarone mixtures | 6,000 | 8 |

The amount of the liquid binder in the composite insulation should not exceed substantially 25% of the total weight of the insulation. Ordinarily the liquid binder should comprise about 8% of the total weight of the insulation as the maximum to enable the composite mica insulation to be impregnated most satisfactorily with a completely reactive resinous composition. We have found that when from 3% to 7% by weight is the liquid binder, a composite mica tape of great strength is produced which lends itself to excellent impregnation.

The liquid resinous polymers of the present invention have been found to wet and to adhere to the mica flakes to enable the composite insulation to be handled, cut, wrapped and treated without excessive separation or loss of the mica flakes. The liquid polymers employed as the binders have not impaired the sheet backing material in strength or flexibility. It will be understood that no liquid resinous polymer is to be employed with a backing composed of a resinous sheet or woven fabric that would be unduly softened or attacked thereby. Tape and other composite insulation prepared in accordance with the invention may be exposed to the atmosphere for long periods of time without evaporation, hardening, or loss of the liquid binder. This feature of the liquid resinous binders is important from a commercial standpoint.

Since certain changes in carrying out the above processes and in the product embodying the invention may be made without departing from its scope, it is intended that the accompanying description and drawing be interpreted as illustrative and not limiting.

We claim as our invention:

1. Flexible mica insulation comprising two superimposed sheets of pliable base material, a layer of mica flakes disposed between the two sheets of pliable base material, and a liquid binder applied to the mica flakes to bind them together and to the pliable sheet base material, the liquid binder having been heated after being applied to the mica flakes, the liquid binder comprising from 3% to 25% of the total weight of the insulation, the liquid binder composed of at least one liquid resinous polymer of a viscosity of between 25 and 10,000 poises at 25° C., the polymer being relatively non-volatile at room conditions, the liquid binder being selected from the group consisting of liquid coumarone indene polymers, liquid copolymers of styrene and coumarone, liquid linear polyesters, liquid polymers of a compound having the formula

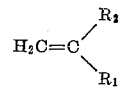

wherein $R_2$ represents a monovalent radical selected from the group consisting of phenyl, saturated alkyl hydrocarbon substituted phenyl, methyl and hydrogen radicals, $R_1$ represents a monovalent radical selected from the group consisting of hydrogen, methyl and —COOX radicals wherein the X representing hydrogen and saturated alkyl hydrocarbon groups, and $R_2$ and $R_1$ are not the same radical.

2. The insulation of claim 1, wherein the binder comprises a liquid alphamethylstyrene polymer of a molecular weight of between 400 and 2000.

3. The insulation of claim 1, wherein the polyester comprises the reaction product of fumaric acid, adipic acid and a hydrocarbon glycol.

4. The insulation of claim 1, wherein the binder comprises a liquid polymer of a compound having the formula

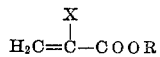

where X represents a monovalent radical selected from the group consisting of hydrogen and saturated aliphatic hydrocarbon radicals and R is selected from the group of monovalent radicals consisting of hydrogen and saturated aliphatic hydrocarbon radicals.

References Cited in the file of this patent

UNITED STATES PATENTS

| | | |
| --- | --- | --- |
| 1,771,367 | Adams | July 22, 1930 |
| 2,012,948 | Broughton | Sept. 3, 1935 |
| 2,462,228 | Schulman et al. | Feb. 22, 1949 |
| 2,479,357 | Hill et al. | Aug. 16, 1949 |
| 2,562,004 | Watson et al. | July 24, 1951 |
| 2,656,290 | Berberich et al. | Oct. 20, 1953 |